United States Patent [19]

Gilham

[11] Patent Number: 4,934,846

[45] Date of Patent: Jun. 19, 1990

[54] FRANKING SYSTEM

[75] Inventor: Dennis T. Gilham, Brentwood, United Kingdom

[73] Assignee: Alcatel Business Systems Limited, Romford, United Kingdom

[21] Appl. No.: 315,589

[22] Filed: Feb. 27, 1989

[30] Foreign Application Priority Data

Feb. 29, 1988 [GB] United Kingdom ................. 8804689

[51] Int. Cl.[5] .......................... B41J 5/00; G06F 7/38; G06F 15/20; G06K 9/03

[52] U.S. Cl. ...................................... 400/104; 101/72; 364/464.2; 364/717; 380/3; 380/23; 380/51; 382/57; 235/431; 235/432; 235/375

[58] Field of Search ............................. 101/91, 71-72; 400/103-105, 73; 283/70-74, 17; 364/464.2, 464.3, 717; 371/24; 380/3-4, 23, 51, 55; 382/57; 235/432, 431, 462, 375

[56] References Cited

U.S. PATENT DOCUMENTS

| | | | |
|---|---|---|---|
| 4,587,411 | 5/1986 | Obstfelder et al. | 400/103 |
| 4,630,201 | 12/1986 | White | 364/717 |
| 4,641,346 | 2/1987 | Clark et al. | 400/104 |
| 4,641,347 | 2/1987 | Clark et al. | 400/104 |
| 4,649,266 | 3/1987 | Eckert | 364/464.2 |
| 4,660,221 | 4/1987 | Dlugos | 400/104 |
| 4,743,747 | 5/1988 | Fougere et al. | 235/375 |
| 4,750,181 | 6/1988 | McDonald et al. | 371/24 |
| 4,775,246 | 10/1988 | Edelmann et al. | 380/23 |
| 4,780,828 | 10/1988 | Whisker | 364/464.2 |
| 4,780,835 | 10/1988 | Sievel et al. | 364/464.2 |
| 4,786,940 | 11/1988 | Daniele | 346/160 |
| 4,796,193 | 1/1989 | Pitchenik | 364/464.2 |
| 4,807,139 | 2/1989 | Liecht | 364/464.2 |
| 4,813,912 | 3/1989 | Chickneas et al. | 364/464.2 |
| 4,821,195 | 4/1989 | Baer et al. | 364/464.2 |
| 4,831,555 | 5/1989 | Sansone et al. | 364/464.2 |

FOREIGN PATENT DOCUMENTS

| | | | |
|---|---|---|---|
| 172759 | 8/1986 | Japan | 400/104 |
| 2179008 | 2/1987 | United Kingdom | 400/103 |

*Primary Examiner*—Eugene H. Eickholt
*Attorney, Agent, or Firm*—Shoemaker and Mattare, Ltd.

[57] ABSTRACT

A method of franking mail items is disclosed in which the franking impression includes a machine readable portion and a visually readable portion. The machine readable portion comprises a data block including at least a postage charge and a pseudo-random number and the data block is encrypted prior to printing. During printing of the franking impression, at least a part of the machine readable portion is read and compared with the data block intended to be printed. If the comparison is satisfactory the printing operation is continued to print the visually readable portion. The pseudo-random number is changed for each franking transaction which may be each item or batch of items. The machine readable portion is read at a mail handling centre to provide an input to a postage charging and accounting function.

19 Claims, 2 Drawing Sheets

FRANKING SYSTEM

BACKGROUND OF THE INVENTION

This invention relates to a method of franking postal items by which postal authorities are enabled to account for charges relating to the handling of mail items and to obtain payment for such charges from the sender of the mail items. The invention also relates to franking apparatus for carrying out the method.

Currently used postage payment systems for franking machines fall into two categories. In one category, in which the postage is prepaid, the franking machine is constructed and operated to securely maintain a record of credit remaining available to a user of the machine and the machine is controlled to lock if and when the credit level decreases to a predetermined low value. Consequently if this low credit level is reached and the machine locks, the machine is unable to be used for further franking until such time as payment has been received by the postal authority for additional credit and the new credit value has been entered in the machine. In the other category in which a post payment method is used, the meter is read periodically and the user invoiced accordingly, use of the franking machine is constrained by controls which lock the machine when total postage value used exceeds a predetermined limit. In both of these categories of system it is necessary for the franking machine to incorporate security measures to prevent fraudulent use of the machine. In order to maintain the integrity of the security complex control systems are used in the internal operation of the machine and the franking machine is constructed to be physically robust and is provided with sealing devices to prevent unauthorised access to the interior of the machine. In addition to the security maintained in the franking machine, the postal authorities operate an elaborate manual procedure for checking franked mail items which necessitates restriction of location at which franked mail can be posted by any sender. The maintenance of security in the franking machine increases the cost of the franking machine and this together with restrictive posting procedures tends to limit the use of franking machines to those users which have a relatively large volume of postal usage.

SUMMARY OF THE INVENTION

Broadly the invention relates to a system of franking mail items comprising printing franking data in machine readable form on said mail items by senders of said items, said franking data including at least data relating to a postage charge for the item encoded in a secure manner to prevent unauthorised printing of said data relating to the postal charge and identification data; utilising a data reading device to read said imprinted franking data from the mail items at a postal authority location to provide data signals relating to each mail item; utilising said data signals to generate a transaction record for each of the franked items and utilising said transaction records to generate a billing account for each sender of franked mail items.

According to one aspect of the invention a method of franking mail items comprises the steps of generating a pseudo-random number relating to a franking transaction; forming a data block containing at least said pseudo-random number and data relating to a postal charge for said mail item; encrypting said data block; printing data representing said encrypted data block together with identification data in machine readable form on a mail item.

Preferably a different pseudo-random number is generated for each franking transaction.

The franking data may be printed on the mail item in the form of a bar code consisting of spaced bar code marks of differing width.

According to another aspect of the invention a method of franking mail items and accounting for postage value used comprises at a mail item franking location the steps of generating a pseudo-random number relating to a franking transaction; forming a data block containing at least said pseudo-random number and data relating to a postal charge for said mail item; utilising an encryption key unique to a franking machine to encrypt said data block; printing data representing said encrypted data block together with data identifying said franking machine in machine readable form on a mail item; and at a postal authority location the steps of machine reading said identification data and printed encrypted data block; selecting from a record of decryption keys a decryption key corresponding to said identification data; utilising said selected decryption key to decrypt said encrypted data block read from the mail item; checking validity of the pseudo-random number contained in said data block and if valid utilising the postage charge data as an accounting input to account for postage value used.

Preferably a record of pseudo-random numbers used in relation to a franking machine identification is maintained; a pseudo-random number read from franking data of a current mail item is compared with the record of pseudo-random numbers; and the franked mail item is accepted for despatch to a destination address only if said pseudo-random number is valid.

In accordance with yet another aspect of the invention franking apparatus includes means to generate a pseudo-random number for each franking transaction; means to form a data block by combining said pseudo-random number with a postal value selected for franking a mail item; and printing means operable to print franking data including said data block in machine readable form on the mail item.

Preferably the franking apparatus includes means operable in combination with a secure encryption key to encrypt said data block.

Preferably the franking apparatus includes reading means operative to read said franking data printed in machine readable form on the mail item; and means operative to compare franking data intended to be printed with the franking data read by said reading device and to terminate franking in the event that the comparison means indicates an error in the printed franking data.

The franking apparatus may include means operable to print a visually readable franking on the mail item only if the comparison means indicates that the printed franking data is free of error.

BRIEF DESCRIPTION OF THE DRAWINGS

A method of and apparatus for carrying out the invention will now be described by way of example with reference to the drawings in which.

DESCRIPTION OF THE PREFERRED EMBODIMENT

Figure 1:
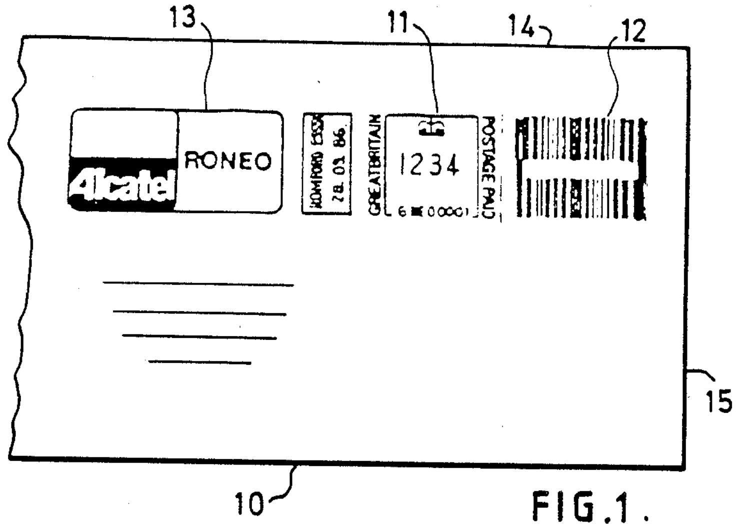
FIG. 1 shows a franking impression on a mail item
Figure 4:
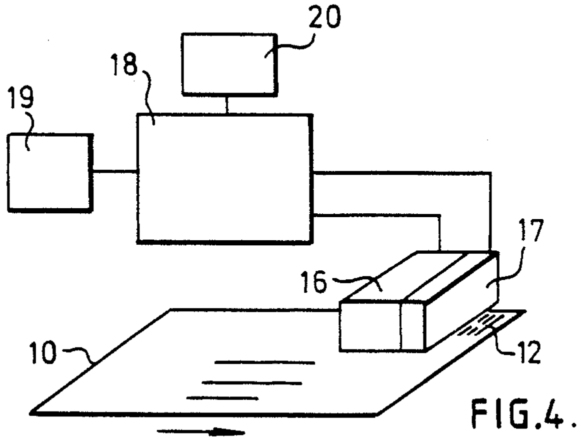

Referring first to FIG. 1, a franking printed onto a mail item 10 comprises two parts indicated as 11 and 12. The part 11 consists of a typical franking such as is applied by current franking machines to enable visual inspection of a mail item to ascertain that it has been correctly franked with a value of postage appropriate to the size or weight of the item, the destination of the item and the postal service such as surface mail or airmail required by the sender. The franking consists of a predetermined pattern as governed by rules laid down by the postal authority and usually includes not only the value of postage but also the date of franking and the licence number of the franking machine. At the time of printing the franking additional information such as a slogan 13 may be printed on the mail item alongside the franking. In addition the franking impression includes the portion 12 consisting of an impression in a coded form which can be read by machine. The coded impression may take a number of forms, the form illustrated consisting of a bar code in which data is represented in binary notation by spaced bars of one or other of two widths. In printing the franking, it is usual for the mail item, an envelope in this present example, to be fed in a direction left to right as seen in FIG. 1 in which the upper edge 14 engages and is guided by a guide on the franking machine and the right hand edge 15 is the leading edge of the envelope. These edges 14 and 15 of the mail item serve as datum edges for the positioning of the franking impression on the item. The bars of the bar code, in the portion 12 of the franking, extend transversely to the direction of feeding of the mail item and are spaced apart in the direction of feeding of the mail item. The portion 12 may consist of a single row of bars or where the quantity of data to be represented would require an unduly long row of bars, the data may be represented by bars arranged in a number of rows, for example two rows, as shown in FIG. 1. It will be appreciated that instead of printing directly onto the envelope, the mail item on which printing is effected may comprise an adhesive label for subsequent application to an envelope or parcel. Conveniently, the franking may be printed by a thermal print head 16 (FIG. 4) which has a plurality of print elements disposed along a line extending transversely to the direction of feeding of the mail item. The print elements are selectively energised in synchronism with the feeding of the mail item in such a manner as to achieve printing of the required franking impression. Since the portion 12 consisting of coded data is required to be read by machine it is desirable to check the printing of the bar code by a reading device 17 positioned upstream and immediately adjacent the print head. The data represented by the bar code in the portion 12 of the franking impression includes date of franking, postage value and franking machine identification which conveniently may be the licence number of the franking machine. In addition it is preferred to include the despatch postal area code and the destination postal code. In order to ensure that the data, particularly that relating to the postage value, is valid and is secure from attempts to fraudulently print or tamper with that data, the data is formed into a secure code or data block. This is effected by causing the franking machine to generate a pseudo-random number and to combine this with at least the postal value to form a data block. This data block is then encrypted using a secure encryption key held in non-volatile memory in the franking machine. The licence number of the franking machine and the despatch and destination areas codes are combined with the secure data block after encryption. The pseudo-random numbers are generated in a sequence so that successive numbers of the sequence are used for each franking transaction. A franking transaction may comprise franking of an individual mail item or may comprise franking of all mail items during a predetermined time period, for example one day. Thus, in the latter instance, the pseudo-random number is reset for each day and this may be effected by an algorithm triggered by resetting the date in the franking machine. Thus the data block for each franking transaction is unique. As will be seen from FIG. 4, the franking machine includes electronic circuits 18 operable to control operation of the print head 16 and to receive output signals from the reading device 17. Non-volatile memory 19 is provided to store the licence number of the franking machine and any other data which may be required in the operation of the machine. The circuits 18 are operable under the control of software programs to generate pseudo-random numbers in sequence and to form a data block by combining a postage charge value input on a keyboard 20, or from another source, and to utilise an encryption key held in a secure location of memory 19 to encrypt the data block and then carry out a printing operation in which franking data including the encrypted data block is printed in the form of a bar code on the mail item fed past the print head 16.

Figure 2:
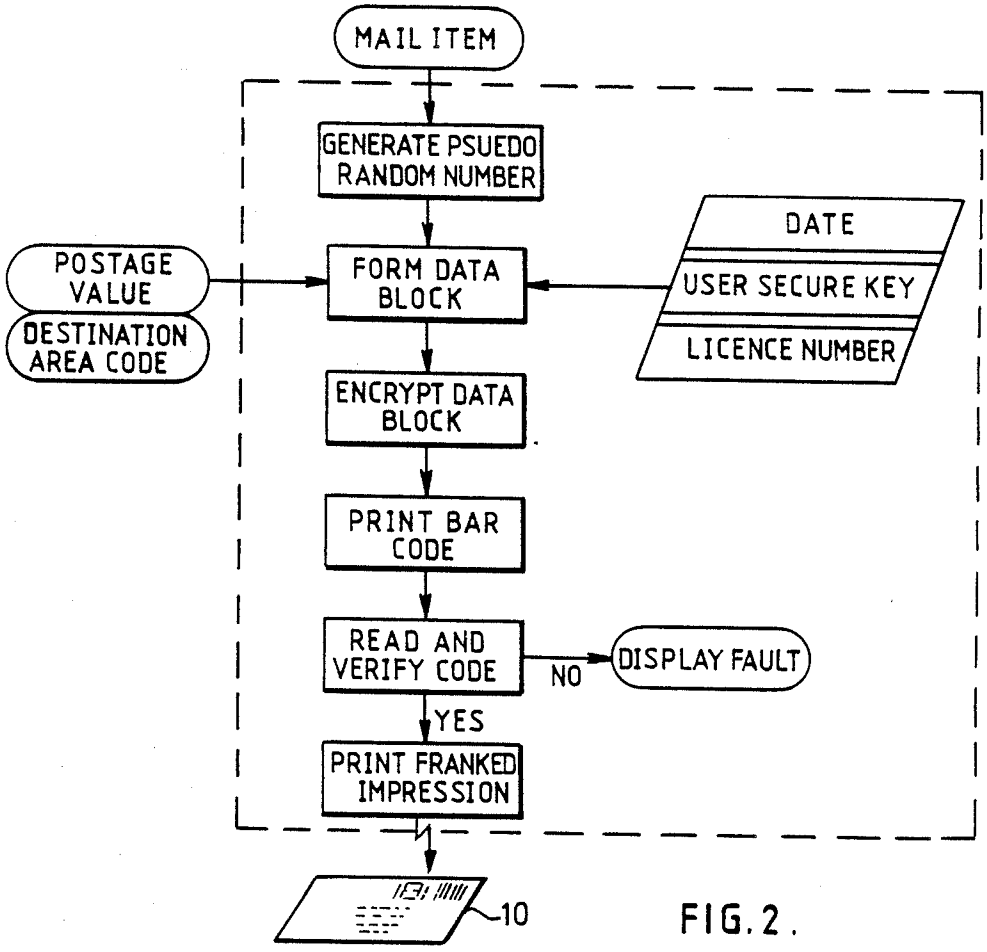
FIG. 2 is a flow diagram of the operation of a franking machine

FIG. 2 illustrates steps in the franking machine operation from which it will be seen that after encryption of the data block, the portion 12 of the franking impression is printed and, immediately thereafter, is read by the reading device. The output of the reading device is compared with the data block intended to be printed. If the comparison indicates that the printed bar code correctly represents the data block, the operation of the franking machine continues so as to print the visually readable portion 11 of the franking impression and the mail item 10 bearing a complete franking impression 11, 12 and, where desired, a slogan or the like 13 is fed from the franking machine. However if the comparison indicates that the data block is not correctly represented by the printing, printing of the remainder of the franking impression is terminated and a fault message is displayed on the franking machine. The output of the reading device in respect of the whole of the portion 12 of the franking impression may be compared with the whole of the data block intended to be printed. However the processing of the data in the comparison operation may take a length of time such that a pause would be required before continuing after a correct comparison to print the visually readable portion 11 of the franking impression. In order to enable the printing of the entire franking impression to be continuous and uninterrupted, the comparison may be carried out on a probability basis and be in respect of only a leading part of the portion 12 of the franking impression. If a comparison in respect of this part of the portion 12 indicates that this part is correct, a decision would be made to continue printing and the visually readable portion would be printed immediately following printing of the machine readable portion in a continuous printing operation. While such a partial comparison would not check the entire portion 12, on a probability basis, if this part has been correctly printed by the printing device, the printing device will continue to function correctly to print the remainder of the portion 12 and the partial comparison will provide an adequate and sufficient check of the printing.

The postage value and destination code are input to the franking machine by the user, or from another station in a mailing system of which the franking machine is a part. The date of franking may be set automatically from a clock device in the franking machine and the licence number is read from a location of non-volatile memory where it is stored.

Figure 3:
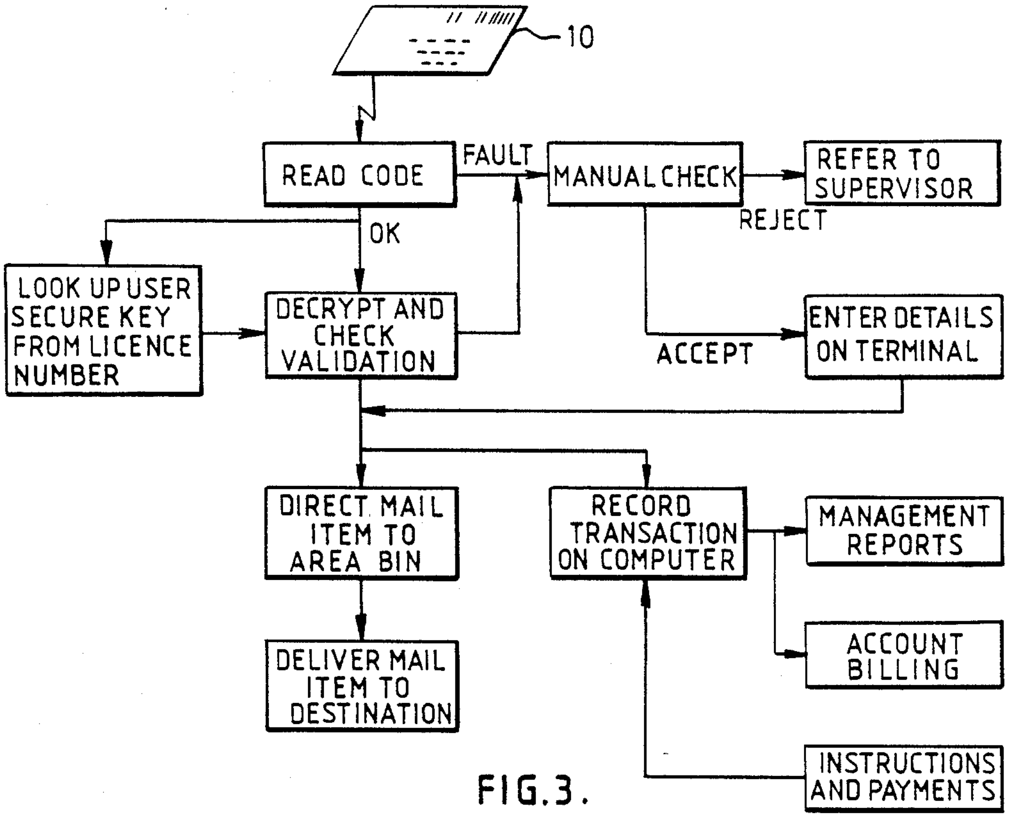
FIG. 3 is a flow diagram of procedures carried out at a postal authority centre and FIG. 4 is a block diagram of franking apparatus.

The licence numbers and corresponding users secure encryption keys are held in a data base accessible by mail handling apparatus at a postal authority location. Referring to FIG. 3, when the franked mail item 10 is received at the postal authority location, it is fed into an automatic mail handling apparatus. The apparatus includes a suitable code reader for reading the bar code of the portion 12 of the franking impression. Upon reading the licence number from the portion 12 of the franking impression, the data base is accessed to obtain the secure encryption key associated with that licence number and the key is utilised to decrypt the secure data block represented by the bar code of portion 12 of the franking impression. Validation checks are carried out on the data within the block to check validity of the data. The validity checks include a check to ensure that the data read from the secure block is error free, a check on the pseudo-random number to ensure that it is a valid current pseudo-random number, a check that the licence number of the machine relates to a current account with the postal authority and a check that the date and value of franking have allowable values. If the validation checks indicate that the coded franking impression is valid and acceptable by the postal authority the mail item is fed for sorting and handling in the usual manner. If the portion 12 of the franking impression includes destination data for the mail item, reading of this destination data by the code reader may be utilised to control mechanical sorting apparatus to direct the mail item to an appropriate destination area bin. In the event that either the reading of the code portion 12 indicates a faulty reading of the data or the validity check on data in the secure data block indicates that the data is not valid, the mail item is directed to a station where a manual check of the franking impression can be effected. If, from the manual check, the franking impression is judged to be valid the franking and destination details are entered manually at a keyboard terminal and the item is re-introduced into the mechanical handling system. On the other hand, if it appears that the franking impression is invalid and possibly results from an attempted fraudulent action, the mail item may be passed to a supervisor for attention. The franking data read from the portion 12 of the franking impression and after decryption of the secure data block, together with similar franking data entered manually on the keyboard terminal is utilised to enter the postal charge for the mail item as a transaction on a computerised accounting system. Billing of users of the franking machines may be effected from the accounting system and in addition reports concerning usage of the mail handling system may be produced for management and other purposes.

I claim:

1. A method of franking mail items comprising the steps of generating a pseudo-random number relating to a franking transaction; forming a data block containing at least said pseudo-random number and data relating to a postal charge for said mail item; encrypting said data block; printing data representing said encrypted data block together with identification data in machine readable form on a mail item.

2. A method as claimed in claim 1 including the steps of machine reading said printed data from said mail item; comparing information obtained from reading said printed data block with information contained in said data block and in response to identity therebetween printing a visually readable franking impression including at least a postage charge on the mail item.

3. A method as claimed in claim 2 wherein the step of comparing is effected in respect of only a part of the information obtained from reading said printed data block.

4. A method as claimed in claim 2 wherein the step of comparing is effected in respect of the whole of the information obtained from reading said printed data block.

5. A method as claimed in claim 1 including the step of generating for each of a series of franking transactions respectively a next pseudo-random number of a series of pseudo-random numbers.

6. A method as claimed in claim 5 wherein a franking transaction comprises franking of a single mail item and wherein the next pseudo-random number of the series is generated for the franking of each successive mail item.

7. A method as claimed in claim 5 wherein a franking transaction comprises franking of a batch comprising a plurality of mail items and wherein the next pseudo-random number of the series is generated for the franking of a first mail item of each successive batch of mail items.

8. A method as claimed in claim 7 including the steps of registering a current date and generating the next pseudo-random number of the series in response to change in the registered date.

9. A method of franking mail items and accounting for postage value used comprising at a mail item franking location the steps of generating a pseudo-random number relating to a franking transaction; forming a data block containing at least said pseudo-random number and data relating to a postal charge for said mail item; utilising an encryption key unique to a franking machine to encrypt said data block; printing data representing said encrypted data block together with data identifying said franking machine in machine readable form on a mail item; and at a postal authority location the steps of machine reading said identification data and printed encrypted data block; selecting from a record of decryption keys a decryption key corresponding to said identification data; utilising said selected decryption key to decrypt said encrypted data block read from the mail item; checking validity of the pseudo-random number contained in said data block and if valid utilising the postage charge data as an accounting input to account for postage value used.

10. A method as claimed in claim 9 including the step at the postal authority location of maintaining a record of pseudo-random numbers used in franking mail items at the franking location corresponding to the identification data; and comparing the pseudo-random number from the data block read from the mail item with pseudo-random numbers already used at that franking location and accepting the mail item as validly franked if the pseudo-random number has not been used.

11. A method of franking a mail item including the steps of generating a different pseudo-random number for each franking transaction; printing on the mail item franking data in machine readable form, said franking data including a data block containing data relating to a postal charge for said item and the pseudo-random number applicable to that mail item, said data block being encrypted prior to printing on the mail item.

12. A method of handling a mail item franked in accordance with claim 1 including the steps of utilising a reading device to read the franking data printed on the mail item in machine readable form; maintaining a record of pseudo-random numbers used in relation to a franking machine identification; comparing a pseudo-random number read from franking data of a current mail item with the record of pseudo-random numbers; accepting the franked mail item for despatch to a destination address only if said pseudo-random number is not included in said record and adding the pseudo-random number of the franking data of the current item to said record of pseudo-random numbers.

13. Franking apparatus including means to generate a pseudo-random number for each franking transaction; means to form a data block by combining said pseudo-random number with a postal value selected for franking a mail item; and printing means operable to print franking data including said data block in machine readable form on the mail item.

14. Franking apparatus as claimed in claim 13 including means operable in combination with a secure encryption key to encrypt said data block prior to printing on the mail item.

15. Franking apparatus as claimed in claim 13 including reading means operative to read said franking data printed in machine readable form on the mail item; and means operative to compare franking data intended to be printed with the franking data read by said reading device and to terminate franking in the event that the comparison indicates an error in the printed franking data.

16. Franking apparatus as claimed in claim 15 wherein the printing means is operative to print visually readable franking on the mail item only if the comparison indicates that the printed franking data is free of error.

17. Franking apparatus as claimed in claim 16 wherein the printing means is operative to print a visually readable franking including at least a visually readable postage value.

18. A method of franking mail items comprising the steps of generating a series of pseudo-random numbers, each said random number relating to a specific franking transaction and being independent of postal data relating to any mail item; forming a data block containing at least said unique pseudo-random number and data relating to a postal charge applicable to said mail item; utilising a stored encryption key to encrypt said data block; printing data representing said encrypted data block together with identification data in machine readable form on the mail item.

19. A method of franking mail items and accounting for postage value used comprising at a mail item franking location the steps of generating independently of postal data relating to any mail item a pseudo-random number relating to a specific franking transaction; forming a data block containing at least said pseudo-random number and data relating to a postal charge for said mail item; storing an encryption key unique to said franking location; utilising said encryption key to encrypt said data block; printing data representing said encrypted data block together with data identifying said franking location in machine readable form on the mail item and at a postal authority location the steps of machine reading said identification data and said encrypted data block; storing a record of a plurality of encryption keys relating to a plurality of franking locations; selecting from said record that encryption key corresponding to said identification data; utilising said selected encryption key to decrypt said encrypted data block read from the mail item to reveal said pseudo-random number and said postage charge data; checking validity of said revealed pseudo-random number and if valid utilising the revealed postage charge data as an input to an account record to account for postage value used.

* * * * *